(12) United States Patent
Kato (10) Patent No.: US 9,549,091 B2
(45) Date of Patent: Jan. 17, 2017

(54) IMAGE READING APPARATUS CAPABLE OF INSTANTANEOUSLY EXECUTING FUNCTION WITH DOCUMENT SETTING ON PLATEN GLASS AND IMAGE FORMING APPARATUS

(71) Applicant: KYOCERA Document Solutions Inc., Osaka (JP)

(72) Inventor: Ryosuke Kato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/995,993

(22) Filed: Jan. 14, 2016

(65) Prior Publication Data

US 2016/0205280 A1  Jul. 14, 2016

(30) Foreign Application Priority Data

Jan. 14, 2015 (JP) ................................. 2015-004824

(51) Int. Cl.
*H04N 1/04* (2006.01)
*H04N 1/00* (2006.01)
*H04N 1/10* (2006.01)

(52) U.S. Cl.
CPC ...... *H04N 1/00702* (2013.01); *H04N 1/00551* (2013.01); *H04N 1/00708* (2013.01); *H04N 1/00758* (2013.01); *H04N 1/10* (2013.01); *H04N 2201/0094* (2013.01)

(58) Field of Classification Search
CPC ............ H04N 1/00702; H04N 1/00551; H04N 1/00708; H04N 1/00758; H04N 1/10

USPC ................................ 358/1.12, 1.15, 1.9, 474
See application file for complete search history.

(56) References Cited

U.S. PATENT DOCUMENTS

2003/0016405 A1*  1/2003  Tecu .................. H04N 1/00559
358/506

FOREIGN PATENT DOCUMENTS

| JP | H03-098057 A | 4/1991 |
| JP | H11-069096 A | 3/1999 |
| JP | 2004-212440 A | 7/2004 |
| JP | 2005-017809 A | 1/2005 |
| JP | 2005-159766 A | 6/2005 |
| JP | 2011-151570 A | 8/2011 |

* cited by examiner

*Primary Examiner* — Houshang Safaipour
(74) *Attorney, Agent, or Firm* — Hawaii Patent Services; Nathaniel K. Fedde; Kenton N. Fedde (57) ABSTRACT

Provided is an image reading apparatus that instantaneously executes functions and settings with the setting of a document on a platen glass, and an image forming apparatus. The image reading part according to the present disclosure includes a platen cover, an opening and closing detecting part, and an operation executing part. The document placing position detecting part acquires position placing data by pre-scan of a scanner, when opening of the platen cover is detected, after the opening of the platen cover is detected, and detects a placing position of a document placed on the platen glass based on the acquired placing position detecting data. The operation executing part receives selection of functions corresponding to the placing position detected by the document placing position detecting part and executes the selected function.

8 Claims, 9 Drawing Sheets

| LEFT BACK REFERENCE (VERTICAL) | |
|---|---|
| FUNCTION | COPY |
| SETTING | 10 COPIES |
| EXECUTION | ○ |

| RIGHT BACK REFERENCE (VERTICAL) | |
|---|---|
| FUNCTION | FACSIMILE |
| SETTING | FINE |
| EXECUTION | × |

| LEFT FRONT REFERENCE (VERTICAL) | |
|---|---|
| FUNCTION | SCANNER |
| SETTING | PREVIEW |
| EXECUTION | ○ |

| RIGHT FRONT REFERENCE (VERTICAL) | |
|---|---|
| FUNCTION | DATA COMMUNICAION |
| SETTING | 400dbi |
| EXECUTION | × |

IMAGE READING APPARATUS CAPABLE OF INSTANTANEOUSLY EXECUTING FUNCTION WITH DOCUMENT SETTING ON PLATEN GLASS AND IMAGE FORMING APPARATUS

INCORPORATION BY REFERENCE

This application is based on and claims the benefit of priority from Japanese Patent Application No. 2015-004824 filed on Jan. 14, 2015, the entire contents of which are hereby incorporated by reference.

BACKGROUND

The present disclosure relates to an image reading apparatus that reads a document placed on a platen glass, and to an image forming apparatus.

Conventionally, it has been known so far aMFP (Multi-function Peripheral) having plural different functions to process read image out by an electric copying machine and a facsimile, as an image forming apparatus equipped in a platen glass with a document reading part that reads a photograph and a document, or the like. In such a image forming apparatus, the image forming apparatus receives selection of functions and an input of various settings, and executes the selected function under the inputted setting after a document is placed on a platen glass.

Recently, it has been proposed a technology which reduces selection of functions and an input of various settings, and improves the work efficiency. In a conventional technology, when it is recognized that a document is set at a reference position out of an ordinary reading range, a specific function (book mode) is selected. Further, in the conventional technology, a setting (linking margin quantity) is inputted depending on a distance between the set document and the reference position in the selected function (book margin mode). Moreover, in another conventional technology, when it is detected that a platen to press a placed document is a closed state, the technology reads an image of the placed document and previews the image of the document even if a reading start instruction is issued.

SUMMARY

A present disclosure provides an image reading apparatus including a document reading part that scans a document placed on a platen glass by a scanner and reads image data; and an operation part that receives selection of functions to process the image data, the apparatus comprising: a platen cover that opens and closes an upper surface of the platen glass; an opening and closing detecting part that detects opening and closing of the platen cover; a document placing position detecting part that causes the scanner to acquire placing position detecting data by pre-scan when closing of the platen cover is detected, after the opening of the platen cover is detected, and detects a placing position at which the document is placed on the platen glass based on the acquired placing position detecting data; a memory part that stores linking operation information in which the placing position is correlated with the function; and an operation executing part that receives selection of functions corresponding to the placing position detected by the document placing position detecting part based on the linking operation information, and executes the selected function. Also, the present disclosure provides an image reading method including a document reading part that scans by a scanner a document placed on a platen glass and reads image data, and an operation part that receives selection of functions to operate the image data, the method being executed by the image reading apparatus that executes the selected function, the method comprising the steps of: detecting opening of the platen glass that opens and closes an upper surface of the platen glass; acquiring placing position detecting data by pre-scan of the scanner after the opening of the platen cover is detected; detecting a placing position of the document placed on the platen glass based on the acquired placing position detecting data; storing linking operation information in which the placing position and the function is correlated with each other; and receiving selection of functions corresponding to the placing position detected by the document placing position detecting part based on the linking operation information.

DETAILED DESCRIPTION

Next, an exemplary embodiment of the present embodiment will be specifically described with reference to the accompanying drawings.

Figure 1:
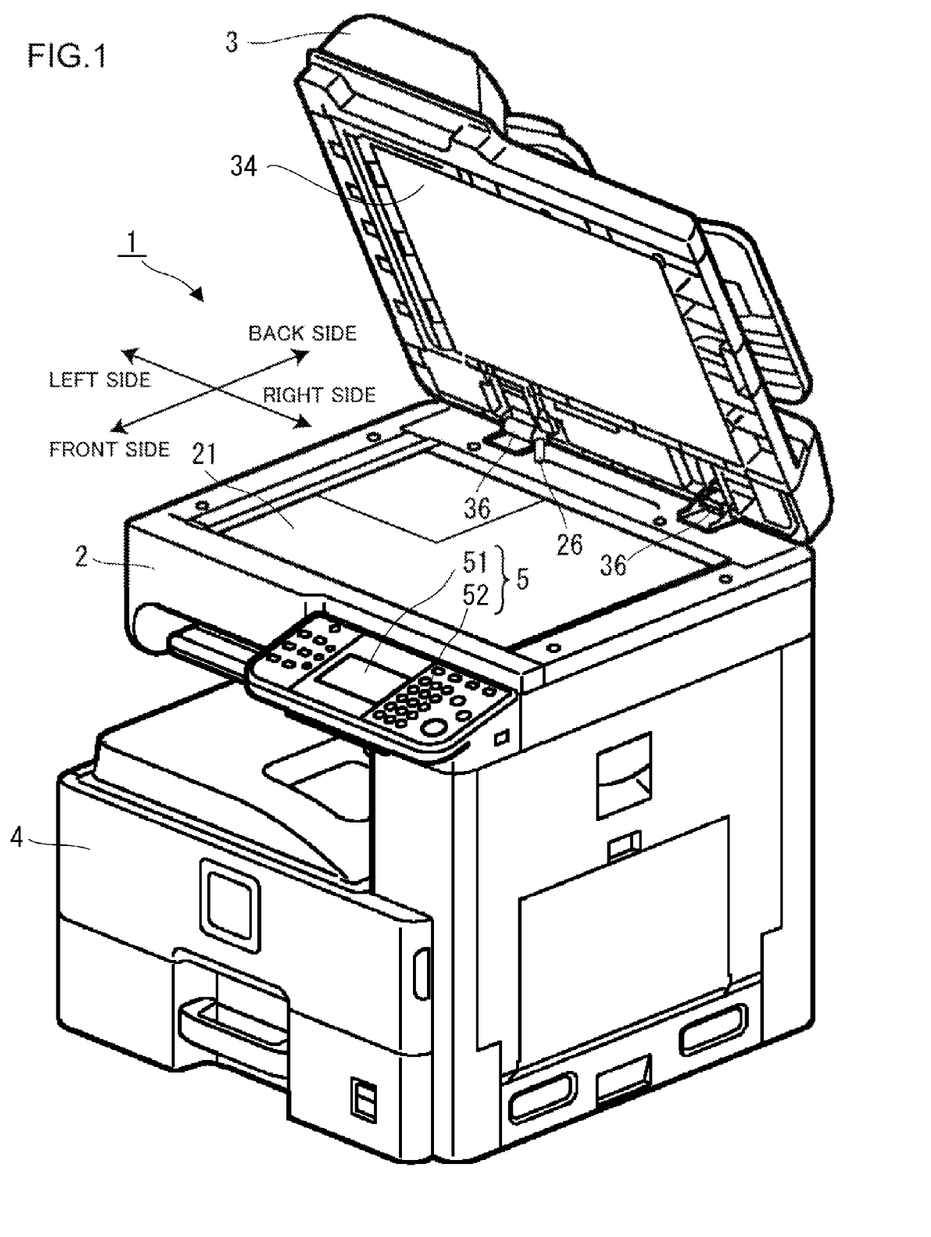
FIG. 1 is an external perspective view showing a structure of an embodiment of an image forming apparatus according to the present disclosure.
Figure 2:
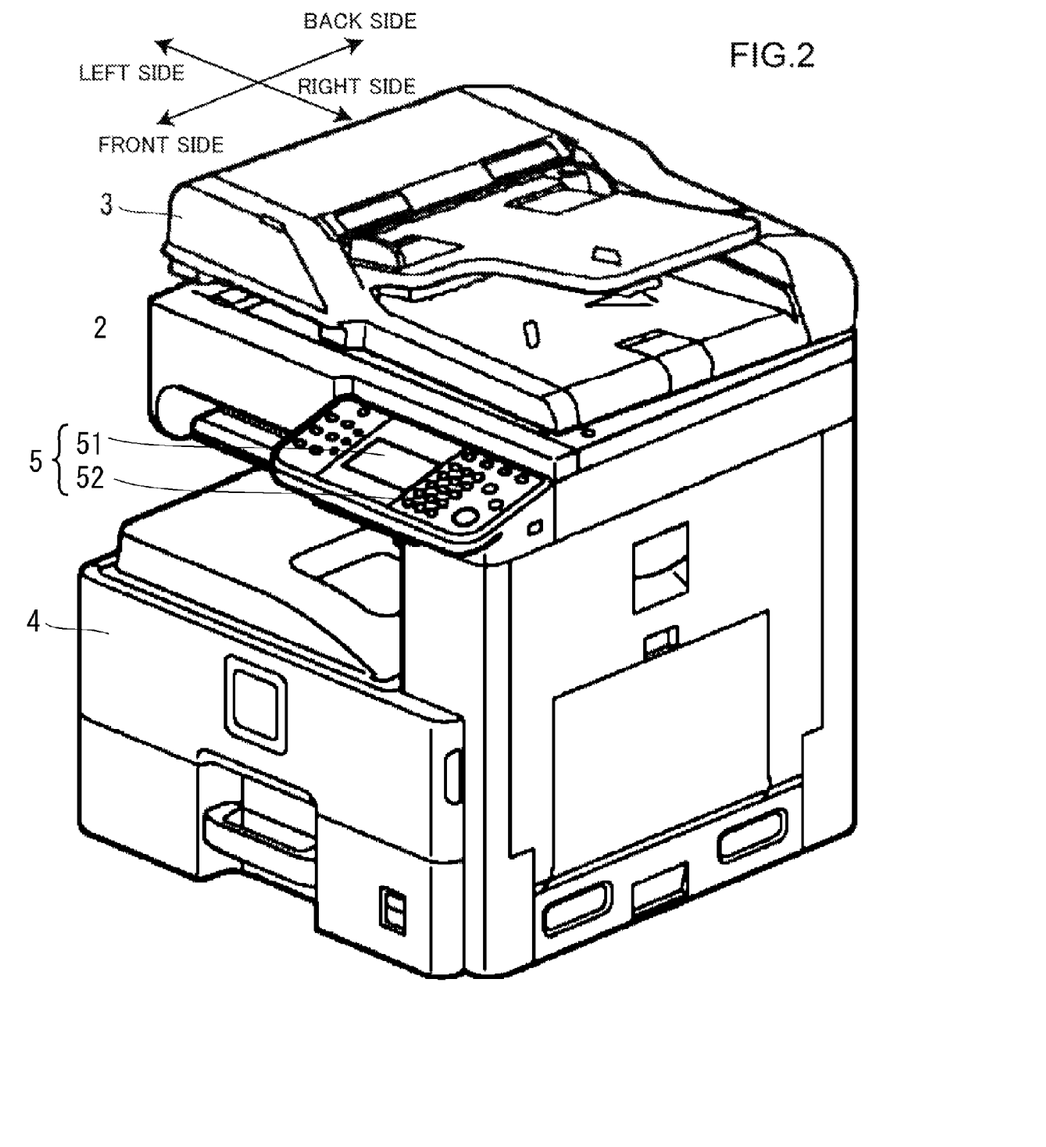
FIG. 2 is an external perspective view showing a structure of an embodiment of an image forming apparatus according to the present disclosure.

An image reading apparatus of the present disclosure is an image forming apparatus such as a MFP (Multifunction Peripheral). The image forming apparatus is a multifunction peripheral 1 having a function as a scanner device reading an image of a document, a function as a copying machine recording the read image on a recording paper P, a function as a facsimile device facsimile transmitting the read image, and a function as a communication device data transmitting the read image. Referring to FIG. 1 and FIG. 2, the multifunction peripheral 1 includes a document reading part 2, a document feeding part 3, a main body part 4, and an operation part 5. The document reading part 2 is arranged on an upper part of the main body part 4. The document feeding part 3 is arranged an upper part of the document reading part 2. The operation part 5 is arranged at a front side of the multifunction peripheral 1. Further, the document feeding part 3 and the document reading part 2 are connected by a hinge mechanism 36 at a back side of the multifunction peripheral 1. The document reading part is configured to be able to open a platen glass 21 on an upper surface of the document reading part 2 by opening the document feeding part 3 in an upward direction from the front side. There is respectively shown in FIG. 1 a state where the document feeing part 3 is opened widely, and in FIG. 2 a state where the document feeding part 3 is opened small.

At the front side of the multifunction peripheral 1, an operation part 5 responsible for settings and operation instructions of the multifunction peripheral 1 is arranged. The operation part 5 is provided with a liquid crystal display part 51 and an operation button 52. A user inputs instructions by operating the operation part 5 to make various settings of the multifunction peripheral 1 and cause the multifunction peripheral 1 to execute various functions such as image forming, or the like. The liquid crystal display part 51 is configured to be able to display a state of the multifunction peripheral 1, display an image formation situation and the number of printing, and make various settings such as functions of duplex printing and black and white inversion, and magnification setting, as well as density setting, as a touch panel. As the operation button 52, there is provided a start button instructed by a user to start image formation, a stop/clear button used when the image formation is stopped, a reset button used when the various settings of the multifunction peripheral 1 are set to a default state, and ten key, or the like.

Figure 3:
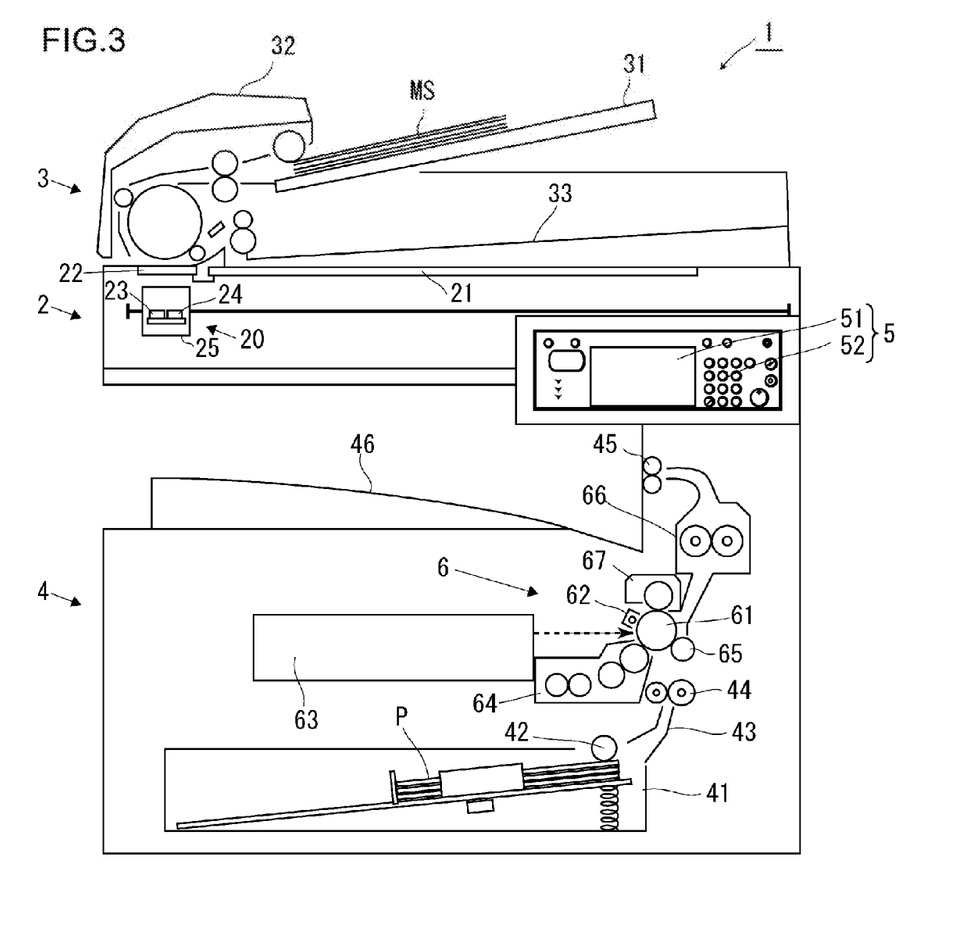
FIG. 3 is a schematic cross sectional view showing an internal structure of an image forming apparatus according to the present disclosure.

Referring to FIG. 3, the document reading part 2 includes a scanner 29, a platen glass 21, and a document reading slit 22. The scanner 20 includes a light source 23 using a LED (Light Emitting Diode), a light receiving part 24 configured such as of a CCD (Charge Coupled Device) line sensor and a CMOS (Complementary Metal Oxide Semiconductor) line sensor, and a carriage 25 housing therein the light source 23 and the light receiving part 24. The carriage 25 is configured to be able to move in a conveying direction of a document by the document feeding part 3. The platen glass 21 is a platen which is made of a rectangular transparent member such as a glass and is arranged on an upper surface of the document reading part 2. In the present embodiment, the platen glass 21 has an A3 size and whose short side is arranged in parallel with a main scanning direction. The document reading slit 22 is a slit formed in a direction orthogonal to a conveying direction of a document by the document feeding part 3.

The document feeding part 3 includes a document placing part 31, a document feeding mechanism 32, and a document discharging part 33. A document placed on the document placing part 31 successively conveys one by one by the document feeding part 32 to a position opposed to the document reading slit 22. Subsequently, the document is discharged into the document discharging part 33.

The document feeding part 3 functions as a platen cover opening and closing an upper surface of the platen glass 21. Opening the document feeding part 3 in an upward direction opens the upper surface of the platen glass 21 and comes to a state where the platen glass 21 can be set. Further, an opposite surface to the platen glass 21 in the document feeding part 3 acts as a white document cover surface 34. Referring to FIG. 1, an opening and closing sensor 26 is provided in the document feeding part 2 as an opening and closing detecting part opening and closing the document feeding part 3 (platen cover). The opening and closing sensor 26 is a micro switch detecting that opening of the document feeding part 3 (platen over) becomes wider than a previously set threshold angle. The micro switch is turned off when an opening angle of the document feeding part 3 (platen cover) is smaller than the threshold angle and turned on when an opening angle of the document feeding part (platen cover) 3 is larger than the threshold angle. The threshold angle at which the opening and closing detecting sensor 26 is turned on and off is set as follows. When image data is read by the document reading part 2 while the document feeding part 3 (platen cover) is opened at the threshold angle, the threshold angle is set so that a light irradiated from the light source 23 does not form an image on the light receiving part 24 within the range other than a document.

When instructions are given to read a document by the operation button 52 of the operation part 5 in a state where no document is placed on the document feeding part 31, or in a state where the document feeding part 3 (platen cover) is opened, a document placed on the platen glass 21 is read. When the document placed on the platen glass 21 is read, the scanner 20 is moved to a position opposed to the platen glass 21. Then, the scanner 20 reads the document placed on the platen glass 21 while scanning the document in a sub scanning direction orthogonal to a main scanning direction to acquire image data, and outputs the acquired image data to the main body part 4.

When instructions are given to read a document by the operation button 52 of the operation part 5 in a state where the document is placed on the document feeding part 31, the document conveyed by the document feeding part 3 is read. When the document conveyed by the document feeding part 3 is read, the scanner 20 is moved to a position opposed to the document reading slit 22. Then, the document is read in synchronization with a conveying operation of the document by the document feeding part 3 through the document reading slit 22 to acquire image data, and outputs the acquired image data to the main body part 4.

The main body part 4 includes a document feeding cassette 41 and a recording part 6. A recording paper P fed from the document feeding cassette 41 is conveyed by a conveyance part 42. Then, the recording paper P on which a recording is applied by the recording part 6 is discharged into a discharging space 46 formed between the document reading part 2 and the main body part 4.

Figure 4:
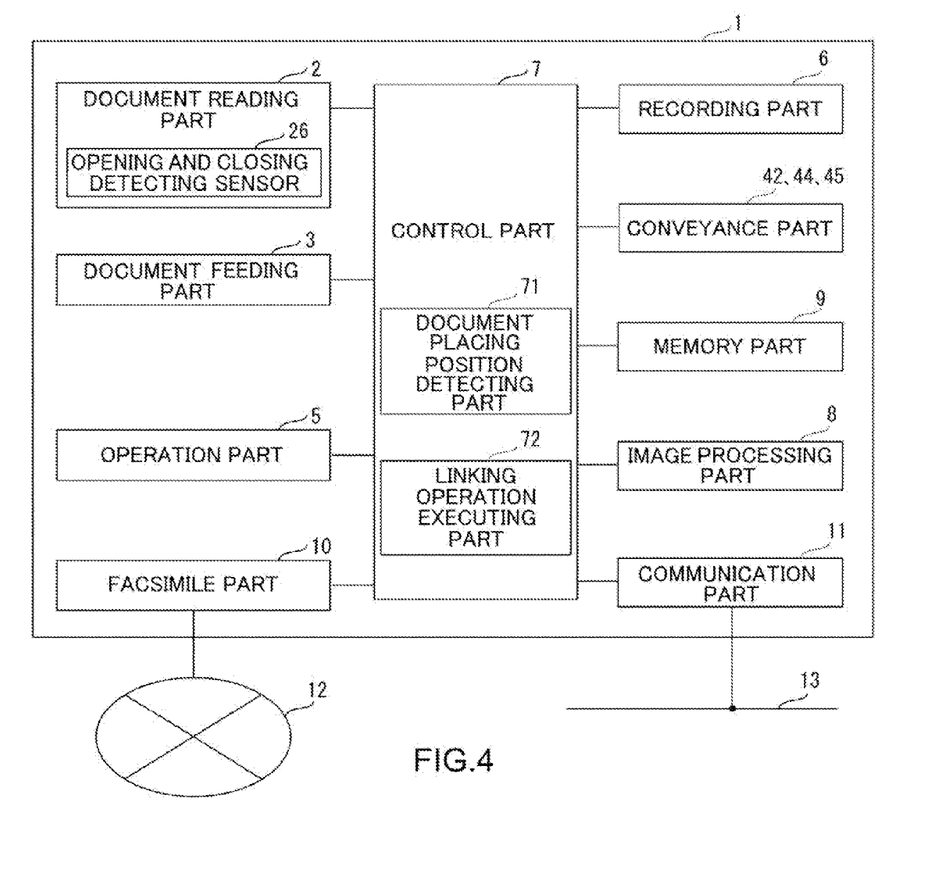
FIG. 4 is a block diagram showing a schematic structure of an image forming apparatus according to the present disclosure.

In FIG. 4, there is shown a block diagram showing a schematic structure of the multifunction peripheral 1. The above-mentioned document reading part 2, the document feeding part 3, the conveyance part 42, the operation part 5, and the recording part 6 are connected to a control part 7 where these parts are controlled thereby. Further, an image processing part 8, a memory part 9, a facsimile part 9, and a communication part 11 are also connected to the control part 7.

The image processing part 8 is a means executing predetermined image processing to image data. For example, the image processing part 8 executes image improving processing, such as zooming in and out processing, gradation adjustment, and density adjustment, or the like.

The memory part 9 stores image data acquired by reading out a document by the document reading part 2 and various management information.

The facsimile part 10 has a facsimile transmission function which generates a facsimile signal from the image data read by the document reading part 2 and transmits the generated facsimile signal via a network 13 such as a telephone line.

The communication part 11 has a data transmission function which transmits the image data read by the document reading part 2 via a network 14 such as a LAN.

The control part 7 is an information processing part such as a microcomputer including a ROM (Read Only Memory) and a RAM (Random Access Memory), or the like. The ROM stores a control program for operation control of the multifunction peripheral 1. The control part 7 reads out the control program stored in the ROM and develops the control program on the RAM to control the whole apparatus in response to predetermined instruction information input from the operation part 5.

The control part 7 functions as a document placing position detecting part 71 that detects a placing position of a document placed on the platen glass 21 in a state where a placing position automatic execution mode is selected. Alternatively, a selection of the placing position automatic execution mode may be selected by a user input from the operation part 5, or may set a state where the placing position automatic execution mode is selected as an initial state. Alternatively, the placing position automatic execution mode may be automatically selected by opening the document feeding part 3 (platen cover).

When closing of the document feeding part 3 (platen cover) is detected by the opening and closing detecting sensor 26, after the opening of the document feeding part 3 (platen cover) is detected by the opening and closing detecting sensor 26, a document placing position detecting part 71 causes the document reading part 2 to acquire placing position detecting data by pre-scan. The pre-scan by the document reading part 2 is executed in a state where the document feeding part 3 (platen cover) is opened at a threshold angle. Accordingly, in the pre-scan, a light irradiated from the light source 23 does not form an image on the light receiving part 24 within the range out of a document. Thereby, a detected signal (brightness) which is detected by the light receiving part 24 and serves as placing position detecting data becomes higher within the range of a document, and becomes lower within the range out of the document.

Figure 5:
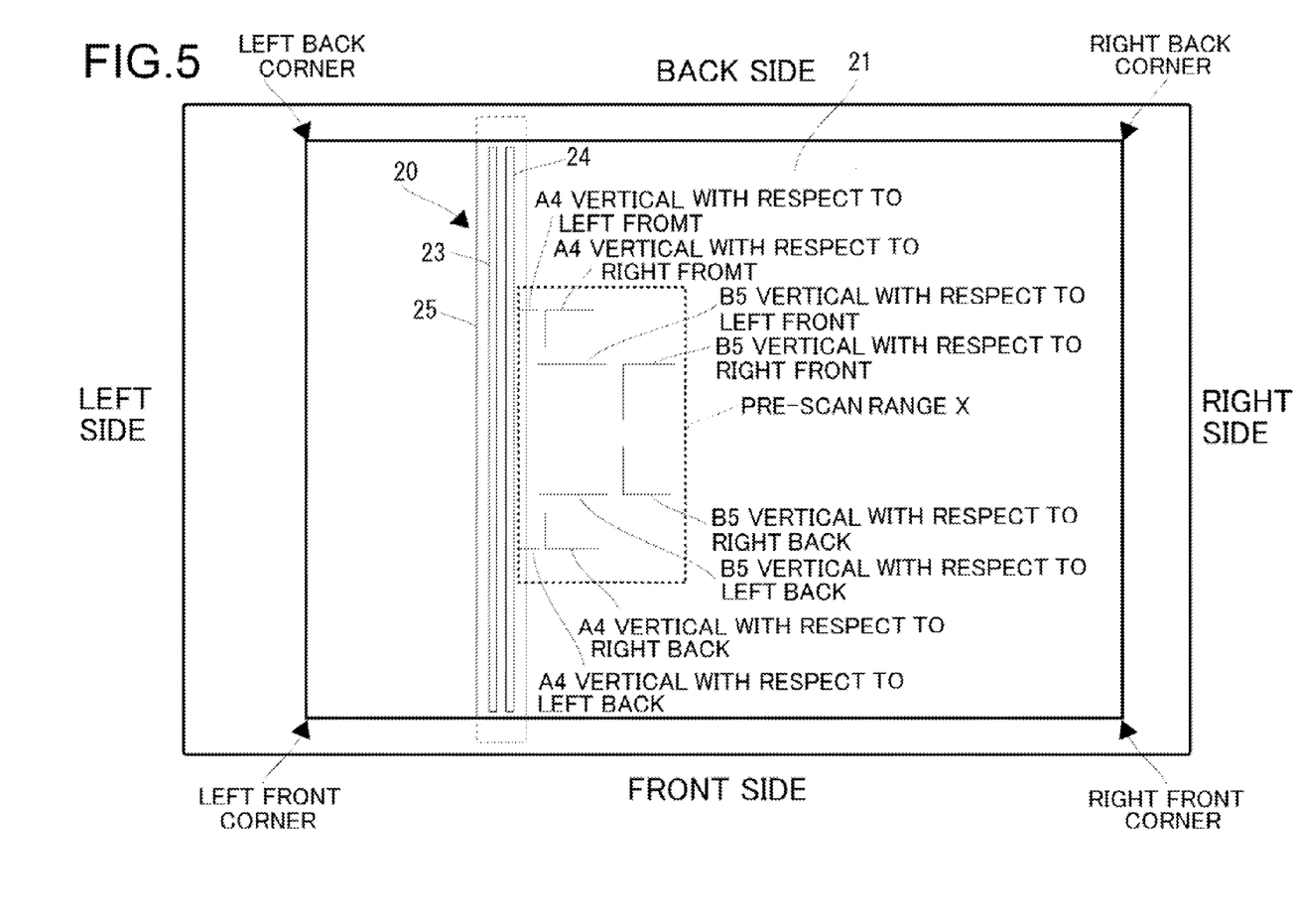
FIG. 5 is an explanatory drawing explaining a pre-scan range of rescan by a document reading part shown in FIG. 4.

As shown in FIG. 5, a pre-scan range X within which the placing position detecting data is acquired by pre-scan of the document reading part 2 is previously set. The pre-scan range X is set to a range at least including a side positioned at the front side of A4 and B5 sized documents placed in a vertical orientation with respect to a back left corner of the platen glass 21, a side positioned at a back side of A4 and B5 sized documents placed in a vertical orientation with respect to a left front side corner of the platen glass 21, an angle positioned at a near side and a left side of A4 and B5 sized documents positioned in a vertical orientation with respect to a right back side corner of the platen glass 21, and an angle positioned at a back side and a right side of A4 and B5 sized documents positioned in a vertical orientation with respect to a left front corner of the platen glass 21. In this context, a case where a short side of a document is placed in parallel with a main scanning direction is a vertical orientation, while in a case where a short side of a document is placed orthogonal to the main scanning direction is a horizontal orientation.

Figure 6:
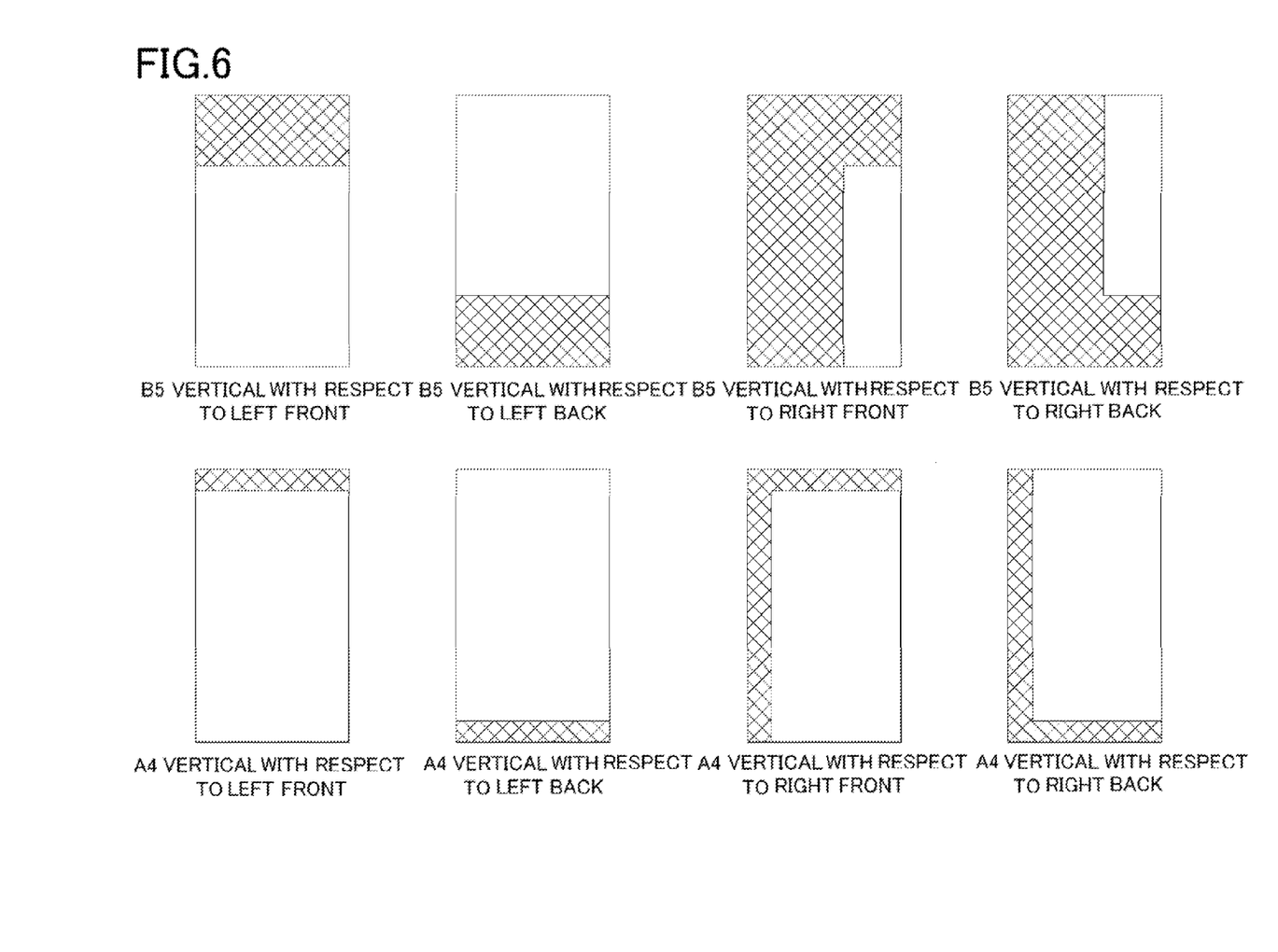
FIG. 6 is an explanatory drawing explaining a document placing position detecting operation by a document placing position detecting part shown in FIG. 4.

In FIG. 6, there is shown eight types of placing position detecting data acquired by pre-scan. When a A4 sized document or a B5 sized document is placed in a vertical orientation with respect to any of the four corners (left back corner, left front corner, right back corner, right front corner) of the platen glass 21, the placing position detecting data is any of the eight types shown in FIG. 6. Thus, the document position detecting part 71 detects on which reference of the four corners (left back corner, left front corner, right back corner, right front corner) of the platen glass 21 a document is placed in a vertical orientation, as a placing position of the document placed on the platen glass 21, based on the acquired placing position detecting data.

Figure 7:
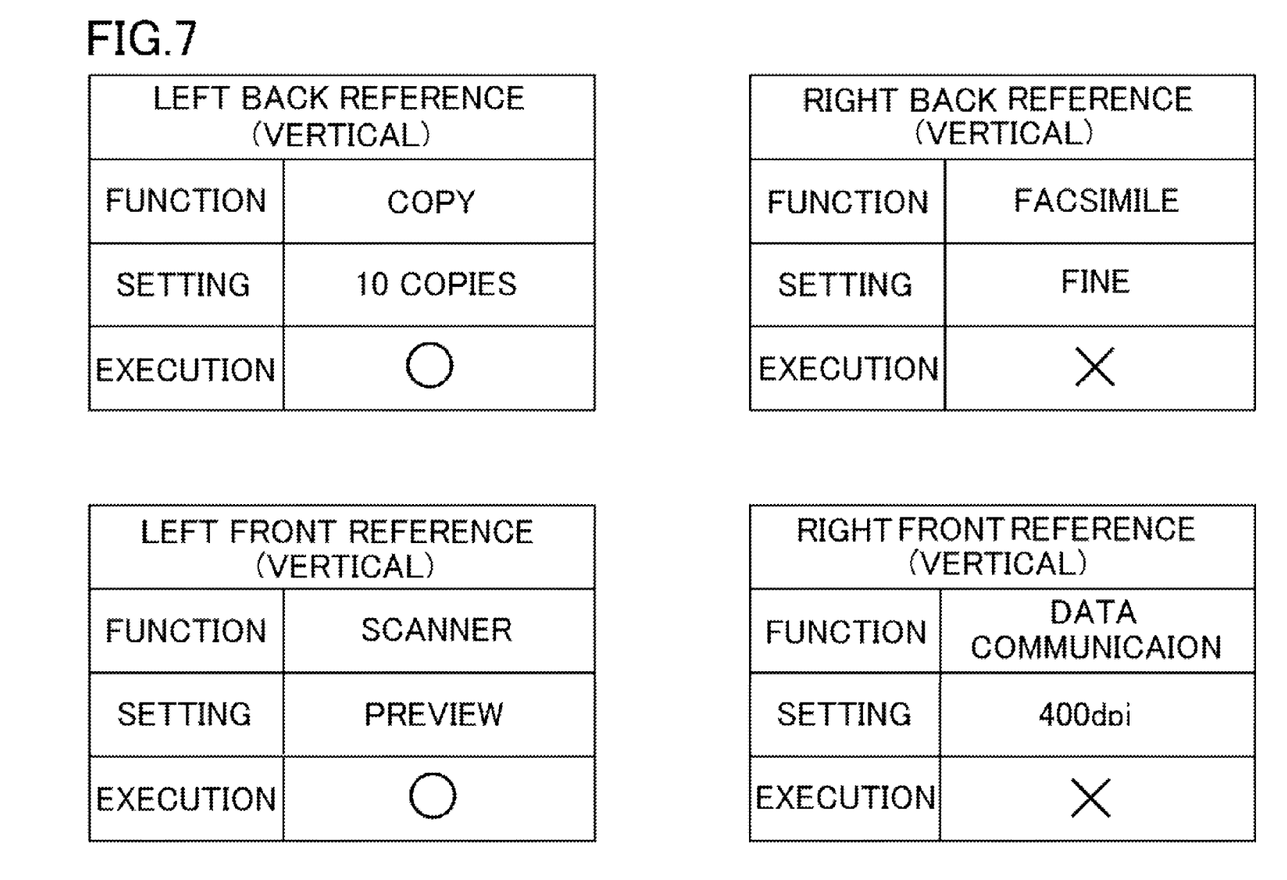
FIG. 7 is view showing an example of linking information stored in a memory part shown in FIG. 4.

When a placing position of the document is detected, the control part 7 functions as the linking operation executing part 72. As shown in FIG. 7, the memory part 9 stores linking operation information in which placing positions of a document are correlated with functions, setting, and presence or absence of execution are. The linking operation executing part 72 selects a function corresponding to a placing position by referring to the linking operation information, and receives an input of settings corresponding to the placing position. Then, if the presence or absence of execution corresponding to the placing position is "present (○)", the linking operation executing part 72 executes the selected function under the received setting. The linking operation information is configured to be able to set by a user by an input from the operation part 5.

In the linking operation shown in FIG. 7, when a left back reference position (vertical) at which a document is placed in a vertical orientation with respect to a left back corner of the platen glass 21, as a placing position is detected, the linking operation executing part 72 selects "copy" as a function, receives an input 10 copies as the number of copies setting, and executes the selected "copy" function with the number of copies: 10 copies. Further, in the linking operation information shown in FIG. 7, when a left front reference position (vertical) at which a document is placed in a vertical orientation with respect to the left front corner of the platen glass 21, as a placing position is detected, the linking operation executing part 72 selects "scanner" as a function, receives an input of "preview" as a display setting, and executes the "scanner" function under the "preview". Furthermore, in the linking operation information shown in FIG. 7, when a right back reference position (vertical) at which a document is placed in a vertical orientation with respect to the right back corner of the platen glass 21, as a placing position is detected, the linking operation execution part 72 selects "facsimile" as a function, and receives an input of "fine" as a transmission quality setting. Moreover, in the linking operation information shown in FIG. 7, a right front reference position (vertical) at which a document is placed in a vertical orientation with respect to the right front corner of the platen glass 21, as a placing position is detected, the linking operation execution part 72 selects "data transmission", as a function, and receives an input of "400 dpi" as a reading quality setting.

Figure 8:
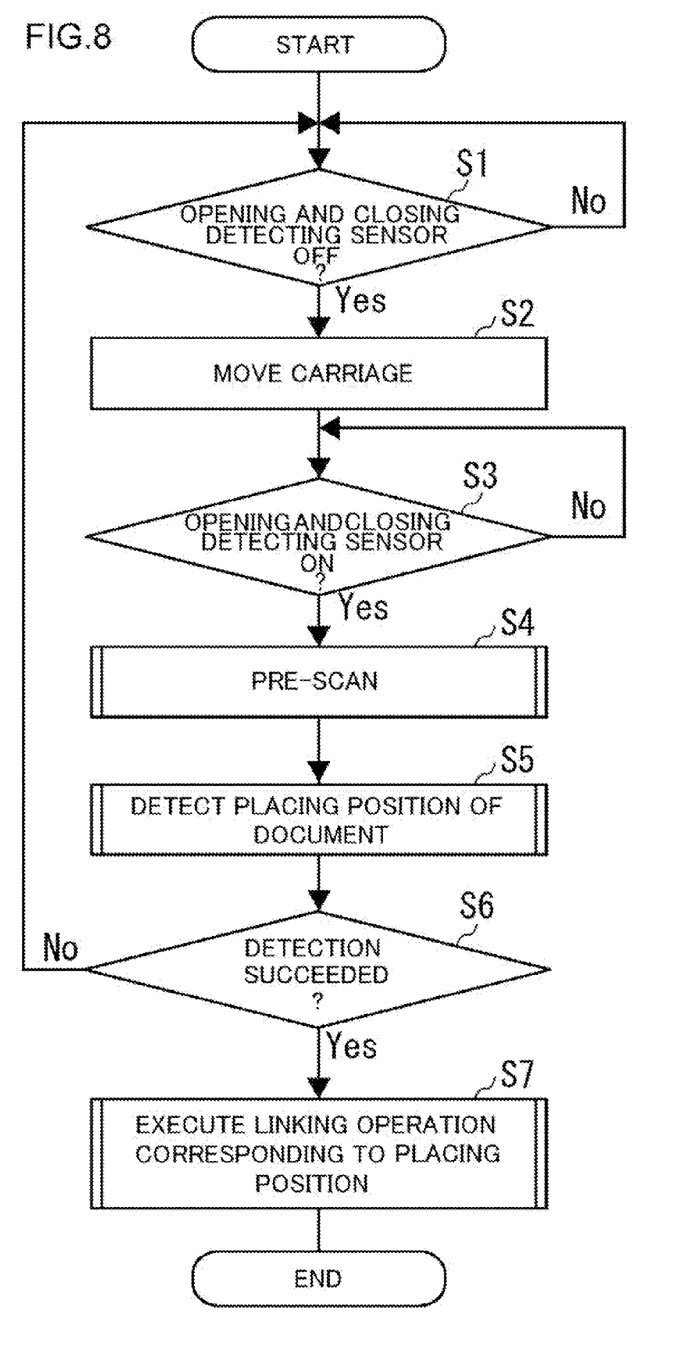
FIG. 8 is a flowchart explaining a placing position automatic execution operation in an image forming apparatus according to the present disclosure.

Next, a placing position automatic execution operation in the multifunction peripheral 1 according to the present embodiment will be specifically described with reference to FIG. 8. The control part 7 receives selection of a placing position automatic execution mode by an input from the operation part 5. Then, if the placing position automatic execution mode is selected, the control part 7 functions as the document placing position detecting part 71, and monitors whether or not the opening detection sensor 26 is turned off, that is, the document feeding part 3 (platen cover) is opened widely than a threshold angle of (step S1). If it is detected in step S1 that the opening and closing detecting sensor 26 is turned off, that is, the document feeding part 3 (platen glass) is opened widely than the threshold angle, the document placing position detecting part 71 causes the carriage 25 to move to a near left end of the pre-scan range X (step S2).

In a state where the document feeding part 3 (platen cover) is opened widely the threshold angle, a user places a A4 sized document or a B5 sized document in a vertical orientation with respect to any of the four corners (left back corner, left front corner, right back corner, right front corner) of the platen glass 21. Alternatively, the control part 7 may be configured to display the linking operation information as shown in FIG. 7 stored in the memory part 9 on the liquid crystal display part 51 of the operation part 5 when the opening and closing detection sensor 26 is turned off in the document position automatic execution mode. In this case, a display of the liquid crystal display part 51 of the control part 5 is changed while the document feeding part 3 (platen cover) is opening, and therefore the linking operation information is captured in user's sight. This attracts user's attention to a linking operation linked to a placing position, thereby placing a document after the linking operation linked to the placing position is confirmed.

Thereafter, the document placing position detecting part 71 monitors whether or not the opening and closing detecting sensor 26 is turned on, i.e., the document feeding part 3 (platen cover) is opened widely than the threshold angle (step S3). The document placing position detecting part 71 can detect, owing to step S3, closing timing of the document feeding part 3 (platen cover) after a document is set in a state where the document feeding part 3 (platen cover) is opened widely than the threshold angle.

If it is determined in step S3 that the opening and closing sensor 26 is turned off, that is, the document feeding part 3 (platen cover) is opened widely than the threshold angle, the document placing position detecting part 71 causes the document reading part 2 to execute pre-scan. Then, the document placing position detecting part 71 causes the document reading part 2 to acquire the placing position detecting data for the pre-scan range X (step S4), and detects a placing position of a document based on the placing position detecting data.

Then, the document placing position detecting part 71 determines whether or not the placing position of the document can be detected (step S6). If the document placing position cannot be detected, the process returns back to step A1 where the document placing position detecting part 71 monitors whether or not the document feeding part 3 (platen cover) is opened widely than the threshold angle. In this context, a case where the placing position of a document cannot be detected is a case where no document is placed on the platen glass 21, or a case where the placing position detecting data does not fall under any of the eight types shown in FIG. 8 resulting from placing of a document of size not subject to detection.

If the placing position of the document can be detected in step S6, the control part 7 functions as the linking operation executing part 72, a linking operation corresponding to the placing position is executed (step S7) by referring to the linking operation information, and terminates the placing position automatic execution operation. The linking operation execution part 72 selects a function corresponding to the placing position, as a linking operation, and receives an input of settings corresponding to the placing position. Then, if the presence or absence of execution corresponding to the placing position is "present (◯)", the linking operation executing part 72 executes the selected function under the received setting. The selected function is executed after a previously set time T1 is elapsed from the time when the opening and closing sensor 26 is turned on. The time T1 is set to time longer than that expected to be required until the document feeding part 3 (platen cover) fully opens from the threshold angle. Alternatively, a second opening and closing selection sensor that detects whether or not the document feeding part 3 (platen cover) is fully closed may be separately provided, and the selected function may be executed at a timing at which opening of the document feeding part 3 (platen cover) is detected by the second opening and closing sensor.

As the linking operation information, the placing position of the document and a document size (for example, A4 or B5) may be correlated with functions, settings, and presence or absence of execution. In this case, the document placing position detecting part 71 detects the placing position and the document size based on the placing position detecting data as shown in FIG. 6. Then, the linking operation executing part 72 selects a function corresponding to the placing position and the document size, and receives an input of settings corresponding to the placing position. If the presence or absence of execution corresponding to the placing position is "present (◯)", the linking operation executing part 72 executes the selected function under the received setting. This enables settings of the linking operation information by subdivision according to the placing position and the document size.

Figure 9:
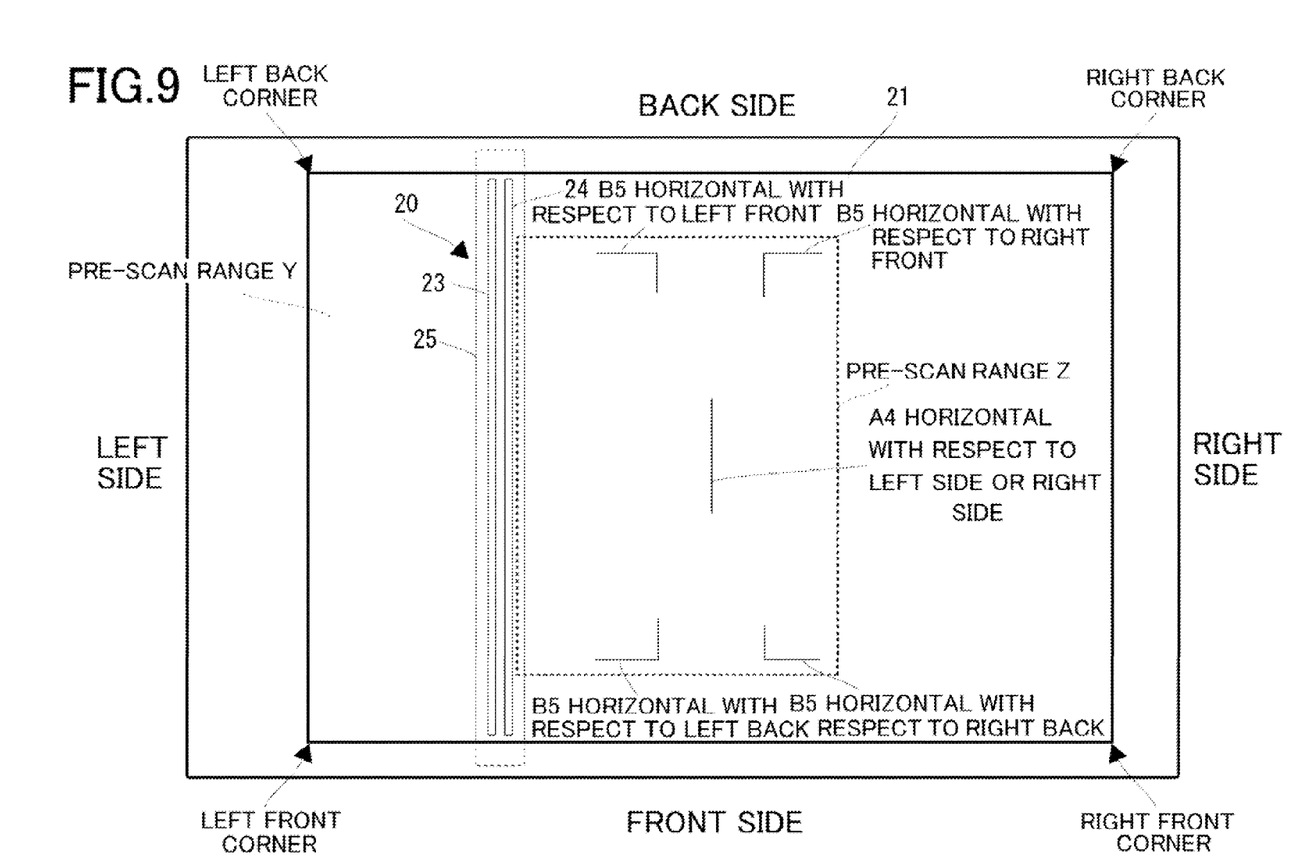
FIG. 9 is an explanatory drawing explaining another pre-scan range of pre-scan by a document reading part shown in FIG. 4

Additionally, the document placing position and a document orientation (vertical orientation or horizontal orientation) may be correlated with functions, settings, and presence or absence of execution. In this case, the document placing position detecting part 71 causes the document feeding part 2 to execute pre-scan, and acquires the placing position detecting data within the pre-scan range X shown in FIG. 9 where the pre-scan range X is displayed in enlarged scale. The pre-scan range X is set to a range at least including a side positioned at the front side of A4 and B5 sized documents placed in a vertical orientation with respect to a back left corner of the platen glass 21, a side positioned at a back side of A4 and B5 sized documents placed in a vertical orientation with respect to a left side corner of the platen glass 21, an angle positioned at a near side and left side of A4 and B5 sized documents positioned in a vertical orientation with respect to a right back side corner of the platen glass 21, and an angle positioned at a back side and a right side of A4 and B5 sized documents positioned in a vertical orientation with respect to a left near corner portion of the platen glass 21. The document placing position detecting part 71 detects a placing position and a document orientation based on the placing position detecting data. Further, the linking operation executing part 72 selects a function corresponding to the document position and the document orientation by referring to the linking operation information, and receives an input of settings corresponding to the placing position. Then, If the presence or absence of execution corresponding to the placing position is "present (◯)", the linking operation executing part 72 executes the selected function under the received setting. This enables settings of the linking operation information by subdivision according to the placing position and the document size.

While in the present embodiment, the embodiment is configured such that the pre-scan by the document reading part 2 is executed in a state where the document feeding part 3 (platen cover) is opened at a threshold angle, not necessarily limited thereto, the pre-scan by the document reading part 2 may be executed in a state where the document feeding part 3 (platen cover) is fully opened, instead thereof. In this case, a placing position of a document can be detected by detecting, as an edge, a shadow formed of the document cover surface 34 of the document feeding part 3 (platen cover) and a document end placed on the platen glass 21.

As mentioned above, in the present embodiment, the multifunction peripheral 1, being the image forming apparatus executing the selected function, includes the document reading part 2 that scans a document placed on the platen glass 21 by the scanner 20; and the document reading part 2 that reads image data; and the operation part 5 that receives selection of a function to execute the image data, the multifunction peripheral 1 comprising the document feeding part 3 (platen glass) that opens and closes an upper surface of the platen glass 21; the opening and closing detecting sensor 26 that detects opening and closing of the document feeding part 3 (platen cover); the document placing position detecting part 71 that cause the scanner 20 to acquire the placing position detecting data by pre-scan, when closing is detected, after the opening of the document feeding part 3 (platen cover) is detected by the opening and closing detecting sensor 26; and detects a placing position of a document placed on the platen glass 21 based on the acquired placing position detecting data; the memory part 9 that stores the linking operation information in which the placing position is correlated with the function; and the linking operation executing part 72 that receives selection of a function corresponding to the placing position detected by the document placing position detecting part 71, and executes the selected function.

According to this arrangement, the arrangement detects the document placing position according to an opening and closing operation of the document feeding part 3 (platen cover) and executes the function correlated with the placing position. Accordingly, it enables instantaneous execution of the function with the setting of a document on the platen glass 21, thereby reducing the workload of a user and improving the work efficiency.

This simplifies part of selection of functions and an input of various settings according to the placing position of the document placed on the platen glass, and eliminates a situation where the function and the setting become less able unless a user executes an operation.

Further, in the present embodiment, the document placing position detecting part 71 detects on which reference of the four corners of the platen glass 21 a document is placed, as a placing position.

This arrangement enables easy election of the placing position by a user.

Furthermore, in the present embodiment, in the linking operation information, the placing position is correlated with the setting. The linking operation executing part 72 receives an input of settings corresponding to the placing position detected by the document placing position detecting part 71 based on the linking operation information, and executes the selected function under the received setting.

This arrangement enables instantaneous input of the setting with the settings of the document on the platen glass 21, thereby reducing the workload of a user and improving the work efficiency.

Furthermore, in the present embodiment, in the linking operation information, the placing position in correlated with the presence or absence of execution. The linking operation executing part 72 executes the selected function when the presence or absence of execution corresponding to the placing position detected by the document placing position detecting part 71 is present based on the linking operation information.

This arrangement enables selection of whether or not a function is to be executed with the setting of a document on the platen glass 21, thereby improving usability.

Moreover, in the present embodiment, in the linking operation information, the placing position and the document size are correlated with the function. The document placing position detecting part 71 detects the placing position and the document size. The linking operation executing part 72 receives an input of settings corresponding to the placing position and document size detected by the document placing position detecting part 7 based on the binding operation information, and executes the selected function under the received setting.

This arrangement enables the setting of the linking operation information by subdivision according to the placing position and the document size.

Moreover, in the present embodiment, in the linking operation information, the placing position and the document orientation is correlated with the function. The document placing position detecting part 71 detects the placing position and the document size.

The linking operation executing part 72 receives an input of settings corresponding to the placing position and the document orientation detected by the document placing position detecting part 71, and executes the selected function under the received setting.

This arrangement enables setting of the binding operation information by subdivision according to the placing position and the document orientation.

Besides, in the present embodiment, the operation part 5 is a touch panel equipped with the liquid crystal display 5, and includes the control part 7 that causes the liquid crystal display 51 to display the linking operation information when opening of the document feeding part 3 (platen cover) is detected by the opening and closing detecting sensor 26.

This arrangement enables attracting user's attention to a linking operation linked to the placing position, thereby placing a document after the linking operation linked to the placing position is confirmed.

It is quite obvious that the present disclosure is not necessarily limited to the above-mentioned embodiments, and each of the embodiments may be appropriately modified within the technical idea of the present disclosure. Further, no special limitation is imposed on the number of components, positions, and shapes, or the like of the above-mentioned embodiments, rather preferable numbers, positions, shapes, or the like may be taken. Throughout the drawings, like components are given the same reference numerals.

What is claimed is:

1. An image reading apparatus including a document reading part that scans a document placed on a platen glass by a scanner and reads image data; and an operation part that receives selection of functions to process the image data, the apparatus comprising:
   a platen cover that opens and closes an upper surface of the platen glass;
   an opening and closing detecting part that detects opening and closing of the platen cover;
   a document placing position detecting part that causes the scanner to acquire placing position detecting data by pre-scan when closing of the platen cover is detected, after the opening of the platen cover is detected, and detects a placing position at which the document is placed on the platen glass based on the acquired placing position detecting data;
   a memory part that stores linking operation information in which the placing position is correlated with the function; and
   an operation executing part that receives selection of functions corresponding to the placing position detected by the document placing position detecting part based on the linking operation information, and executes the selected function;

wherein the operation part is a touch panel equipped with a display part, and further comprises a control part that causes the display part to display the linking operation information when opening of the platen cover is detected by the opening and closing detecting part.

2. The image reading apparatus according to claim 1, wherein the document placing position detecting part detects whether or not a document is placed with respect to any of the four corners of the platen glass, as the placing position.

3. The image reading apparatus according to claim 1, wherein in the linking operation information, the placing position and the settings are correlated with each other; and the linking operation executing part receives an input of settings corresponding to the placing position detected by the document placing position detecting part based on the linking operation information, and executes the selected function under the received setting.

4. The image reading apparatus according to claim 1, wherein in the linking information, the placing position and the settings are correlated with each other; and the linking operation executing part executes the selected function when executed or non-executed corresponding to the placing position detected by the document placing position detecting part is executed.

5. The image reading apparatus according to claim 1, wherein in the linking information, the placing position and the document size are correlated with the function; the document placing position detecting part detects the placing position and the document size; and the linking operation executing part receives the placing position detected by the document placing position detecting part and an input of the settings corresponding to the document size, and executes the selected function under the received setting.

6. The image reading apparatus according to claim 1, wherein in the linking information, the placing position and a document orientation are correlated with the function; the document placing position detecting part detects the placing position and the document orientation; and the linking operation executing part receives the placing position detected by the document placing position detecting part and an input of settings corresponding to the document size, and executes the selected function under the received setting.

7. An image forming apparatus comprising the image reading apparatus according to claim 1 and an image forming part that forms an image based on the image data read by the image reading apparatus.

8. An image reading method including a document reading part that scans by a scanner a document placed on a platen glass and reads image data, and an operation part that receives selection of functions to operate the image data, the method being executed by the image reading apparatus that executes the selected function, the method comprising the steps of:

detecting opening of the platen glass that opens and closes an upper surface of the platen glass;

acquiring placing position detecting data by pre-scan of the scanner after the opening of the platen cover is detected;

detecting a placing position of the document placed on the platen glass based on the acquired placing position detecting data;

storing linking operation information in which the placing position and the function are correlated with each other; and receiving selection of functions corresponding to the placing position detected by the document placing position detecting part based on the linking operation information;

wherein the operation part is a touch panel equipped with a display part, and further comprises a control part that causes the display part to display the linking operation information when opening of the platen cover is detected.

* * * * *